United States Patent Office 3,224,831
Patented Dec. 21, 1965

3,224,831
METHOD OF TREATING ENGINE EXHAUST GAS WITH AN OXIDATION CATALYST CONTAINING PLATINUM AND PHOSPHORUS
Ruth E. Stephens, Detroit, Mich., assignor to Ethyl Corporation, New York, N.Y., a corporation of Virginia
No Drawing. Filed July 12, 1961, Ser. No. 123,424
8 Claims. (Cl. 23—2)

This invention relates to noble metal catalysts and a method for their preparation. The invention also relates to a method of substantially oxidizing the hydrocarbon and carbon monoxide constituents which are present in the exhaust gas of internal combustion engines.

Suggestions of several catalytic converter systems for this application are found in the prior art. With such systems the exhaust gases are passed over a catalytic bed wherein the noxious materials are converted to an inactive form. However, these systems have their shortcomings in that catalyst efficiency is low, or the catalyst may not become active until higher temperatures are reached, or that the catalyst activity is markedly reduced due to the many potential catalyst poisons found in the exhaust gas stream. In spite of the great amount of research devoted to this area, a system which is able to meet these requisites and function efficiently over long periods of time has not been devised.

One of the more important considerations in an exhaust gas catalyst system is the temperature at which the catalyst becomes active. In suburban areas where such a device finds great utility, automobile trips are oftentimes relatively short and the engine is operated under comparatively low temperatures. Under these conditions, catalyst activity may, at best, be nominal. Moreover, under cold conditions, a majority of modern automobiles utilize an automatic choke and thereby operate under an extremely rich fuel-air mixture. Accordingly, the exhaust gas during this warm-up period will contain a much higher percentage of unburned hydrocarbons and carbon monoxide as compared to emissions under steady-state equilibrium conditions. Thus, it is very important to have the catalyst operate effectively at as low a temperature as possible.

With use catalyst efficiency generally decreases and the minimum temperature required for catalytic activity increases. Thus, in addition to being initially efficient at relatively low temperatures, a successful catalyst must retain this low temperature efficiency over a long period of time. My observations have been that in fact, with use, increasingly higher temperatures are required to activate the catalyst. In other words, although a catalyst may originally be active at say 525° F., with use, higher temperatures are required to activate the catalyst. Eventually, a catalyst bed temperature of over 600° F. may be required before the catalyst will actually promote the oxidation of carbon monoxide and hydrocarbons.

It is an object of this invention to provide noble metal catalysts. Another object is to provide a method of preparing platinum catalysts such that, with use, not only does the minimum temperature for activation not increase, but it actually decreases. Another object is to provide a method for effectively oxidizing the carbon monoxide and hydrocarbon constituents found in the exhaust stream of internal combustion engines.

Broadly, the objects of this invention are accomplished by providing catalysts prepared by impregnating an appropriate catalyst carrier with a compound of platinum and treating the resulting composite with from about one to 15 percent, based on the weight of the carrier, of a compound of phosphorus selected from the group consisting of the acids of phosphorus and ammonium phosphate. The sequence in treating with the phosphorus compound is not critical. The benefits of this invention can be obtained by first treating the carrier with the phosphorus compound and then impregnating with the platinum solution, or impregnating with a common solution of the phosphorus compound and the platinum compound, or by impregnating with the platinum solution followed by the treatment with the phosphorus compound. The resulting composite is then dried and subjected to heat at temperatures within the range of from about 300 to 1000° C.

Optionally, the composite may be treated with any of the reducing agents well known to the art. These include, but are not limited to, organic acids such as oxalic acid, aldehydes such as formaldehyde, hydrogen sulfide, hydriodic acid, ferrous chloride, stannous chloride, sulfur dioxide, sodium sulfite and the like. However, it is preferable to use organic reducing agents such as oxalic acid and formaldehyde because the decomposition products of these materials do not adhere to the catalyst and may be readily removed. Another method of accomplishing the reduction step is to subject the catalyst to hydrogen treatment at temperatures of from 300 to 1000° C.

An essential feature of the present invention is to cause the carrier-platinum composite to be contacted with from about one to 15 percent by weight of the above defined phosphorus compound. I have discovered that catalysts prepared in this manner, with use, have the remarkable property of showing activity at increasingly lower temperatures. I am unable to explain this surprising behavior, but I have observed that catalysts prepared in a similar manner, but omitting the phosphorus compound treatment or using other treating agents, behave in the normal manner and, with use, increasingly higher temperatures are required in order to activate the catalyst.

Although the method of this invention is specifically directed to platinum catalysts, the method is applicable to catalysts containing other metals such as, but not limited to, the metals of Groups IB and VIII of the Fifth and Sixth Periods of the Periodic Table, see "Inorganic Chemistry" by Therald Moeller, John Wiley and Sons, Inc., New York, New York, 1952, page 123. This group, commonly known as the noble metals, includes ruthenium, rhodium, palladium, silver, osmium, iridium, platinum and gold. The finished catalyst may also contain a mixture of any of these metals. It is understood that the benefits afforded by this invention are not necessarily uniform for all metals, but that the efficacy of the present method may vary from metal to metal.

The impregnated metal or metals may exist in the metallic state or an an alloy or as an oxide. The finished catalyst system contains from about 0.003 to 5 percent by weight of the metal or a mixture of metals in any of the forms stated above. An optimum amount of the metal in most applications is from about 0.01 to about 1.0 weight percent. The amount of the metal required for efficient operation may vary dependent upon the particular metal used. For the purposes of this invention, I have found it preferable to use platinum catalysts containing from about 0.01 to about one percent of the metal. Platinum catalysts prepared according to my method are active at low temperature and with use show high activity at increasingly lower temperatures. They have the ability to operate under a wide variety of conditions and are resistant to the many potential catalyst poisons found in the exhaust stream of internal combustion engines.

One or more additional metals may be included in the catalysts of this invention. The addition metal or metals act as "promoters" that is, though in themselves they may have little activity, they impart better characteristics to the finished catalyst. Generally, promoters serve to improve the activity, stability, or selectivity for the reaction in question and oftentimes it is difficult to make a distinction as to their specific function. The promoter metal, present in amounts of from about 0.1 to 5 percent based on the weight of the carrier material, may be present in an oxide form or as the free metal. Metals that may be used as promoters include sodium, lead, potassium, magnesium, calcium, strontium, barium, titanium, chromium, zirconium, iron, cobalt, nickel, copper, manganese, zinc, cadmium, germanium, tin, cesimum, gallium, vanadium, scandium and the Lanthanide Series of Elements including yttrium, lanthanum, cerium, praseodymium, neodymium, promethium, samarium, europium, gadolinium, terbium, dysprosium, holmium, erbium, thulium, ytterbium, lutecium (see pages 891–893 of Moeller supra) and the like including metals from Groups I, II, III, IV, V, VI, VII and VIII of the Periodic Table of Elements. These metals may be introduced at any convenient time during preparation of the catalyst as salts such as a nitrate, acetate, carbonate and the like, or in the form of oxides or hydroxides, or even as the finely divided metal itself.

A variety of materials may be used as the carrier for the catalysts of this invention. Included among these are aluminum oxides and hydroxides, transitional aluminas, aluminum silicates, aluminum gels, magnesia gels, oxides or other metals such as thoria, magnesia, zirconia and the like. It is understood that the benefits afforded by this invention are not necessarily uniform for all carriers, but that the efficacy may vary for different carriers. In an exhaust gas application, I have found it preferable to use aluminum-type catalyst carriers. These materials are, in general, quite susceptible to the phosphorus compound treatment and give superior results. Included among these materials are porous aluminum oxides in various states of oxidation and hydration as well as aluminum hydroxide. The alumina may be synthetically prepared or may be naturally occurring. Of the alumina carriers, I prefer to use the activated type. In the most preferred embodiment, I prefer to use activated alumina known in commerce as transitional alumina. These aluminas are metastable forms which, in general, are produced by heating of alpha or beta alumina trihydrates or alpha alumina monohydrate. As these starting materials are heated, phase changes take place, and on prolonged heating, and particularly at very high temperatures such as 1150° C., they are converted into the so-called "alpha alumina" which is a stable, refractory type of alumina. I prefer to use the intermediate materials which are much more active than the alpha alumina. Dependent upon the starting material and the degree of conversion, these transitional aluminas are known as gamma, delta, eta, theta, kappa, chi, and rho. This nomenclature is set forth in the pamphlet "Alumina Properties," Russell et al., published by the Aluminum Company of America, Pittsburgh, Pennsylvania, 1956. Any of the above-listed transitional aluminas or mixtures thereof are preferred materials for the catalysts of this invention. In most cases, perforce, the materials I use are a mixture of various types of transitional aluminas.

In addition to the inherent transitional nature of the alumina itself, I prefer those catalyst carriers having a surface area of at least 75 square meters per gram and those saving a silica content of from 0.1 to 5 percent. Catalysts prepared using these materials have superior properties with respect to longevity and resistance to the poisoning effects of contaminants found in the exhaust gas stream, and also are heat stable and operate efficiently at extremely high temperatures.

In preparing my catalysts, the carrier is impregnated with a solution of the active metal to form a catalyst composite. A critical feature of the catalysts of this invention is that this composite is treated with from about one to 15 percent of an acid of phosphorus or ammonium phosphate. A solution of the phosphorus compound may be included in the impregnating solution or the catalyst carrier may be impregnated successively with the metal compound and the phosphorus compound or vice-versa. The phosphorus compounds usable for this purpose include ammonium phosphate and the ortho-, pyro-, meta-, and hypo-, forms of both phosphoric and phosphorous acids. While from one to 15 percent of any of the above-enumerated phosphorus compounds accomplishes the purpose of this invention, I have found that using from about 3 to 7 percent of ortho-phosphoric or ortho-phosphorous acids gives optimum results.

The active metal constituent may be incorporated into the catalyst carrier by any of the conventional methods known to those skilled in the art. The particular method of impregnation is not critical but the finished catalyst should preferably have a rather uniform distribution of the active metal over the carrier material. Although reference will be made to preparation of platinum catalysts, the method is general and applicable to other metal catalysts previously enumerated.

The catalysts can be prepared from the metals, from the acid solution of the metal chloride (chloroplatinic acid), from the alkali metal salts of these acids (sodium chloroplatinate), or from an aqueous solution of the ammonium salts of the acids (ammonium chloroplatinate). Ammonium complexes may also be used as starting materials. Included among these are tetrammineplatinum(II) chloride, tetrammineplatinum(II) chloroplatinite, and the like. The usual methods of preparing these supported catalysts is carried out by impregnating the support with an aqueous solution of the acid or with an aqueous solution of the ammonium salt of these acids. Of all the prior art methods, I prefer to employ chloroplatinic acid to impregnate the catalyst carrier. This method is relatively simple, affords convenience in handling and metering, and does not involve noxious or corrosive gases.

A chloroplatinic acid solution is prepared which contains platinum in an amount so as to yield a catalyst composite which contains from about 0.003 to 5, and preferably from about 0.01 to 1, weight percent of platinum. The catalyst carrier, preferably activated transitional alumina, is immersed in the solution and is allowed to stand so as to be thoroughly impregnated, and then subjected to temperatures ranging from about 300 to 1000° C. for from one-half to 3 hours.

Alternatively, the impregnation may be carried out in a series of steps. The alumina carrier is dipped into the platinum solution, dried, and heated at temperatures of from 25 to 1000° C., and the procedure in then repeated several times. Catalysts prepared by this latter technique have a tendency to have the platinum concentrated on the surface and oftentimes show a greater degree of activity.

The dried catalyst composite is then immersed in a solution containing from about one to 15 weight percent, based on the weight of the catalyst carrier, of an acid of phosphorus or ammonium phosphate. While reference will be made specifically to phosphoric acid, this is illustrative only and any of the other above-enumerated phosphorus compounds may be used. The treated composite is then subjected to air oxidation at temperatures of from 300 to 1000° C. The phosphoric acid treatment may also be accomplished with a series of steps comprising immersion in the solution, drying, and heating at from 25 to 1000° C., re-immersion, etc. Optionally, the solution of phosphoric acid may also contain a reducing agent such as oxalic acid, formaldehyde, etc. The resulting composite is then dried and heated in the presence of air at temperatures of from about 300 to 1000° C. for a period ranging from about one-half to 3 hours. Alternatively, the reducing agent may be omitted from the phosphoric acid solution and the aluminum-chloroplatinic acid-phosphoric acid composite subjected to air oxidation at from about 300 to 1000° C. for from one-half to 3 hours. Thereafter, the catalyst mass is subjected to a reducing treatment with hydrogen at elevated temperatures.

An alternative method of treating with the phosphorus compound is to prepare a common solution of chloroplatinic acid and phosphoric acid. The alumina carrier is then impregnated with this solution either in one step or by a series of steps with drying and heating after each immersion, and ultimately the catalyst composite is heated to temperatures of from 300 to 1000° C. for one-half to 3 hours. The reducing agent may also be included in the impregnating solution or the catalyst composite may be afterwards treated with oxalic acid followed by heating at elevated temperatures. Alternatively, the reducing agent may be omitted and the catalyst composite exposed to air oxidation at elevated temperatures and then subjected to a reducing treatment in the presence of hydrogen at elevated temperatures.

If it is desired to impregnate the carrier with several metals, the carrier material may be contacted successively with a solution of each metal or with one solution containing both metals. As described above, the phosphoric acid treatment may be accomplished by including phosphoric acid in the impregnating solution or treating the composite separately with phosphoric acid. Reducing may also be accomplished as described above by including a reducing agent in the impregnating solution, or in the phosphoric acid solution, or treating the alumina--chloroplatinic acid-phosphoric acid composite separately, or the finished catalyst composite may be subjected to reduction in the presence of hydrogen at elevated temperatures of from about 300 to 1000° C.

The following examples are offered to further illustrate the methods of preparing the catalysts of this invention but are in no way intended to impose any limitations thereon.

EXAMPLE I

KA–101 activated transitional alumina (sold commercially by the Kaiser Aluminum Company) is the carrier material of this example. This alumina is composed of about 95.4 percent $Al_2O_3$, about 0.02 percent silica $SiO_2$, about 0.02 percent $Fe_2O_3$, about 0.002 percent $TiO_2$ and 0.40 percent $Na_2O$. On ignition, its loses about 4.2 percent of its weight. It is a spherical form of transitional alumina having a surface area of about 360 square meters per gram. It is prepared by the carefully controlled calcination of β-trihydrate and its principal constituents are eta alumina and alpha monohydrate.

Twenty-seven hundred parts of an aqueous solution containing 0.70 part of platinum as chloroplatinic acid and 67 parts of phosphoric acid is prepared. Thirteen hundred parts of the KA–101 alumina are immersed and then removed from the solution. The composite is allowed to dry at about 100° C. The hardened material is then again immersed in the chloroplatinic acid-phsophoric acid solution so as to absorb the remaining portion. The composite is then allowed to dry and heated to 650° C. for about one hour. The resulting material is then immersed in a methyl alcohol solution containing about 10 parts of oxalic acid. The treated material is then allowed to dry and then subjected to heat at 600° C. in the presence of air. The finished catalyst, comprising a major portion of KA–101 alumina, contains about 0.05 weight percent platinum.

EXAMPLE II

The procedure of Example I is repeated but phosphorous acid is substituted for phosphoric acid and the amount of chloroplatinic acid in the impregnating solution is reduced so that the finished catalyst contains about 0.03 weight percent platinum.

EXAMPLE III

F–1 grade alumina (sold commercially by the Aluminum Company of America) is used as the carrier in this example. This transitional alumina has about 92 percent $Al_2O_3$, about 0.8 weight percent $Na_2O$, about 0.12 percent $Fe_2O_3$, and about 0.09 percent $SiO_2$. On ignition it loses about 6 percent of its weight. It is a granular material having a surface area of about 210 square meters per gram. Its bulk density (packed) is about 55 pounds per cubic foot and its specific gravity is 3.3. It is prepared by calcination of α-alumina trihydrate and contains a mixture of the transitional aluminas described earlier in this specification.

Twenty-two hundred parts of a solution containing 14 parts of platinum as ammonium chloroplatinate

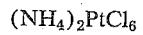

$$(NH_4)_2PtCl_6$$

130 parts of phosphorous acid, and 15 parts of formaldehyde is prepared. Thirteen hundred parts of F–1 alumina are immersed in the solution so as to be thoroughly impregnated. The mixture is heated to dryness and the catalyst composite is subjected to heat at 650 C. for about 2 hours. The finished catalyst, comprising a major portion of F–1 alumina, contains about one percent by weight of platinum.

EXAMPLE IV

Eight hundred parts of KA–101 alumina are immersed in a solution containing 24 parts of phosphoric acid. The mixture is heated to about 500° C. for ½ hour. The treated alumina spheres are then dipped in a solution containing 0.6 part of platinum as chloroplatinic acid, dried at 100° C., and then re-immersed in the platinum solution. The resulting composite is then heated to 750° C. for 2 hours. The hardened catalyst is then immersed in a methanol solution containing 14 parts of oxalic acid and then heated to 750° C. for 2 hours. The finished catalyst contains about 0.07 weight percent platinum.

EXAMPLE V

Six hundred fifty parts of KA–101 alumina are immersed in a solution containing 55 parts of phosphorous acid. The moist alumina pellets are allowed to dry to 100° C. and then immersed in a solution containing 4 parts of palladium as chloropalladic acid and 8 parts of oxalic acid. The catalyst composite is then heated at 600° C. for 3 hours. The finished catalyst contains about 0.6 weight percent palladium.

EXAMPLE VI

The procedure of Example I is followed but in this example chloropalladic acid is substituted for the chloroplatinic acid of Example I. The finished catalyst comprises KA–101 alumina impregnated with about one percent palladium.

EXAMPLE VII

F–3 alumina (sold by the Aluminum Company of America) is used as the carrier of this example. This granular form of transitional alumina has essentially the same elemental analysis as the alumina of Example III. Its loss on ignition is about 7.2 percent by weight, it contains 0.09 weight percent silica and its surface area is about 200 square meters per gram. It is made by the controlled calcination of α-alumina trihydrate and contains a mixture of transitional aluminas.

A solution containing 2 parts of platinum as chloroplatinic acid and one part of palladium as chloropalladic acid and 13 parts of pyro-phosphorous acid ($H_4P_2O_5$) is prepared. Thirteen hundred parts of F–3 alumina are immersed and then removed from this solution. The composite is allowed to dry at temperatures of 100° C. for one hour. The material is then again immersed in the impregnating solution so as to absorb the remaining portion. The composite is then allowed to dry and heated in the presence of air at 500° C. This material is then immersed in a methyl alcohol solution containing about 10 parts of oxalic acid. The mixture is heated to dryness and the resulting material heated in the presence of air at about 650° C. The finished catalyst, comprising a major portion of F-3 alumina, contains about 0.15 percent platinum and 0.07 percent palladium.

EXAMPLE VIII

In this example, aluminum silicate is used as the carrier material. One hundred forty parts of the carrier are immersed in an aqueous solution containing 7 parts of ruthenium as ruthenium nitroso nitrate $RuNo(NO_3)_3$, 21 parts of pyro-phosphoric acid ($H_4P_2O_7$), and 10 parts of formaldehyde. The mixture is heated to dryness and then subjected to heat at 650° C. for about 2 hours. The finished catalyst, comprising a major portion of aluminum silicate, contains about 5 percent ruthenium.

EXAMPLE IX

Six hundred parts of magnesia is immersed in a solution containing 4 parts of rhodium as rhodium nitrate, $Rh(NO_3)_3 \cdot 2H_2O$. The solution is heated to dryness and the resulting composite heated for 2 hours at 400° C. The hardened material is then immersed in a solution containing 6 parts of ammonium phosphate and 8 parts of formaldehyde. The mixture is allowed to dry and then subjected to heat at 700° C. for 2 hours. The finished catalyst contains about 0.6 weight percent rhodium.

EXAMPLE X

An iridium–KA–101 alumina catalyst is prepared in this example. Twelve hundred parts of 5–8 mesh KA–101 alumina is immersed in a solution containing 28 parts of iridium as iridium dichloride, $IrCl_2$, and 45 parts of meta-phosphoric acid, $HPO_3$. The composite is removed from the solution, allowed to dry, and heated to 300° C. for about one hour. This procedure is repeated two additional times and the resulting hardened composite is then subjected to a reducing treatment which comprises heating in a hydrogen atmosphere at about 600° C. for about 3 hours. The finished catalyst contains about 2.2 weight percent iridium.

EXAMPLE XI

The procedure of Example X is followed but 30 parts of hypo-phosphorous acid, $H(H_2PO_2)$, and 4 parts of osmium trichloride $OsCl_3 \cdot 3H_2O$ are substituted for the meta-phosphoric acid and iridium dichloride respectively of Example X. The finished catalyst contains about .3 weight percent osmium.

EXAMPLE XII

Five hundred parts of KA–101 alumina is immersed in an aqueous solution containing 2 parts of gold as gold chloride, $AuCl_3$, and 30 parts of hypo-phosphoric acid, $H_4P_2O_6$, and allowed to stand so as to be thoroughly impregnated. The mixture is heated to dryness at about 100° C., and the resulting composite is heated in air at about 700° C. for about 3 hours. The finished catalyst contains about 0.4 weight percent gold.

EXAMPLE XIII

Eleven hundred parts of F-3 alumina are immersed in a solution containing 3 parts of silver as silver nitrate. The mixture is heated to dryness and the resulting composite is then immersed in an aqueous solution containing 10 parts of meta-phosphorous acid, $HPO_2$. The composite is then allowed to dry for about one hour and then subjected to air oxidation at 600° C. for about 3 hours. The finished catalyst contains about 0.26 weight percent silver.

The results of the following tests show the superior activation properties of the catalysts of this invention.

A series of catalysts were tested using the exhaust gas of a CFR L-head, 7:1 compression ratio, single cylinder engine. The exhaust gas stream was passed through a catalyst bed consisting of 42 cubic inches of the catalyst. A secondary air supply to provide oxygen for the oxidation was introduced into the exhaust gas stream just prior to the catalyst bed. The engine was continuously cycled, 50 seconds under idle conditions and 150 seconds at wide-open throttle. In general, the test was carried out for a period of 80 hours. The operating conditions for the tests are as follows:

*Table I.—Engine operating conditions*

|  | Idle | Wide-open Throttle |
|---|---|---|
| Engine speed, r.p.m. | 750 | 1,140 |
| Volume of exhaust gas s.c.f.h. | 90 | 250 |
| Volume of secondary air s.c.f.h. | 40 | 40 |
| Hydrocarbon (vol. percent) | 0.04 | 0.03 |
| $CO_2$ | 4 | 10 |
| CO | 7 | 3 |
| $O_2$ | 9 | 4.5 |
| Space velocity (v./v./hr.) | 5,350 | 11,900 |

The fuel used to operate the engine and the additives contained therein were chosen so as to severely test the oxidation properties of the catalyst. My experience and that of other workers has shown that fuels containing high amounts of sulfur and high amounts of tetraethyllead impose a severe test on catalyst efficiency and longevity. Accordingly, the fuel used in this test contained 0.12 weight percent sulfur and 12 grams of lead as tetraethyllead. The conditions of this test are much more severe than a catalyst would be subjected to in a commercial application wherein fuels normally contain from about 2 to 4 grams of lead per gallon and contain from about 0.03 to 0.07 weight percent sulfur.

The composition of the fuel on which the engine was operated during this test is as follows:

*Table II.—Fuel composition*

ASTM distillation, ° F.:
  Initial boiling point _____ 97
  10 percent evaporated _____ 148
  50 percent evaporated _____ 266
  90 percent evaporated _____ 327
  Final boiling point _____ 422
Hydrocarbon type, vol. percent:
  Aromatics _____ 40
  Olefins _____ 4
  Saturates _____ 56
Sulfur, wt. percent _____ 0.12
Lead content, g./gal. as tetraethyllead _____ 12.0
Ethylene dichloride, theories _____ 1.0
Ethylene dibromide, theories _____ 0.5

At approximately 20-hour intervals, the temperature at which the catalyst became active was determined in the following manner: the engine was shut down and allowed to cool to room temperature; then the engine was started up and allowed to idle at about 900 r.p.m. By means of thermo-couples appropriately located, temperatures were determined for the exhaust gas stream just prior to entering the catalyst bed and also catalyst bed temperatures were measured. The incoming exhaust gas temperature varied from about 300° F. at the start and increased gradually to about 600° F. as equilibrium conditions were approached. The catalyst bed temperature, due to transfer of sensible heat from the exhaust gas, gradually rose but, of course, were lower than the temperature of the exhaust gas. However, as bed temperature was raised to the catalyst activation temperature, the catalyst became active and promoted the oxidation of carbon monoxide and hydrocarbons with the attendant release of the heat of reaction. This further heated the catalyst bed, resulting in more efficient oxidation with the release of still higher amounts of heat. In this manner, soon after the catalyst bed reached the activation temperature, due to the heat released by the oxidation reactions, the bed temperature exceeded the temperature of the incoming exhaust gas.

As a convenient criterion, the catalyst was said to be active when the temperature of the catalyst bed exceeded the temperature of the incoming exhaust gas by 50° F. Thus, if the inlet exhaust gas temperature was 520° F., and due to the heat released by the oxidation reaction the catalyst bed temperature was 570° F., the catalyst was said to have an activation temperature of 520° F.

Another index of catalyst activity is the catalyst bed temperature for a given inlet exhaust gas temperature. In other words, at a given inlet exhaust gas temperature, the more efficient catalyst will promote a greater degree of oxidation, thereby releasing a larger amount of heat which is reflected in a higher catalyst bed temperature.

A series of transitional alumina-platinum catalysts, treated with several different solutions, were subjected to the above-described techniques to determine their activation properties. The results of these tests are shown in Table III.

ranged from 1230 to 1385° F. This means that these catalysts were extremely active and large amounts of hydrocarbons and carbon monoxide were oxidized, releasing enough heat to elevate the catalyst bed temperature to above 1200° F. In direct contrast, the catalyst bed temperatures for catalysts E–I ranged from less than 540° F. to 985° F. The bed temperature for catalyst E, the untreated platinum catalyst, was only 850° F., some 350° less than the preferred catalysts of this invention. Thus, by both criteria, i.e. (1) the temperature at which the catalyst bed temperaure exceeds the inlet exhaust gas temperature by 50° F. and (2) the catalyst bed temperature for a given inlet exhaust gas temperature, the catalysts of this invention are superior to both the untreated platinum catalysts and platinum catalysts treated with, among others, nitric acid, hydrobromic acid, and acetic acid.

Catalyst oxidation efficiencies while the engine was operated under wide-open throttle conditions were also determined. The hydrocarbon and carbon monoxide concentrations of the exhaust gas stream were measured

*Table III.—Activation temperatures of various alumina-platinum catalysts*

| | Catalysts of this invention | | | | Catalysts not of this invention | | | | |
|---|---|---|---|---|---|---|---|---|---|
| Catalyst | A | B | C | D | E | F | G | H | I |
| Pt content, weight percent | 0.05 | 0.05 | 0.075 | 0.075 | 0.05 | 0.05 | 0.05 | 0.05 | 0.075 |
| Treated with | [1] 3%P | 7%P | 5%P | 15%P | | 2%HNO₃ | 3%HBr | 3%HAC | 1%HNO) |
| Test hours: | | | | | | | | | |
| 0 | 520 | 585 | 510 | 545 | 535 | 540 | 510 | 515 | 480 |
| 20 | 530 | 550 | 510 | 530 | 515 | 540 | 545 | 520 | 525 |
| 40 | 515 | 520 | 500 | 520 | 540 | 545 | 555 | 530 | 520 |
| 60 | 505 | 510 | 470 | 530 | 540 | 565 | 545 | 530 | 540 |
| 80 | ND | 490 | 465 | ND | 535 | 560 | 555 | 550 | 550 |
| 60-hour test: Catalyst bed temperature at inlet exhaust gas temperature of 540° F | 1,230 | 1,210 | 1,385 | 920 | 850 | <540 | 530 | 985 | 785 |

[1] P denotes a phosphorus compound of this invention.  ND=Not determined.

Catalysts A–D of Table III are catalysts within the scope of this invention and were treated in the manner hereinbefore described with a phosphorus compound of this invention. Catalyst E, not treated with a phosphorus compound, and catalysts F–I, treated with non-phosphorus compounds, are not catalysts of this invention.

The data of Table III show that as the tests progressed, catalysts A–D generally became active at increasingly lower temperatures. Optimum results were obtained with catalysts which had been treated with from about 3 to 7 percent of the phosphorus compound. Treatment with 15 percent of the phosphorus compound gave marginal results. Accordingly, the hereinbefore described process of preparing catalysts wherein the alumina-platinum composite is treated with from about 3 to 7 percent of a phosphorus compound of this invention constitutes a preferred embodiment. In direct contrast, catalysts F–I, treated with a variety of other agents and thus not catalysts of this invention, became active at increasingly higher temperatures as the test progressed. Catalyst E, not treated with any agent and also not a catalyst of this invention, became active at essentially the same temperature throughout the test.

After 60 hours of test, catalyst bed temperatures were measured when the inlet exhaust gas temperature reached 540° F. These results are shown at the bottom portion of Table III. These data more strikingly attest to the higher degree of activation of the catalysts of this invention. At an inlet exhaust gas temperature of 540, the catalyst bed temperature for the preferred catalysts A–C before and after passage through the catalyst bed. Typical results are shown in the following table:

*Table IV.—Oxidation efficiencies measured under wide-open throttle conditions*

| Test hours | Hydrocarbon reduction | Carbon monoxide reduction |
|---|---|---|
| 0 | 70 | 87 |
| 20 | 40 | 75 |
| 40 | 35 | 72 |
| 60 | 32 | 72 |
| 80 | 27 | 65 |

The above results were obtained while the engine was operated on the previously described fuel which contained 0.12 weight percent sulfur, 12 ml. tetraethyllead per gallon. In a commercial application, the concentration of sulfur and tetraethyllead would be much lower and hence any detrimental effect attributable to these constituents, small as it may be, would be further reduced or eliminated.

While other catalysts of this invention can be used in an exhaust gas application, I especially prefer to use platinum catalysts prepared by the method of this invention. These catalysts have good initial activities and, considering the extremely adverse environment in an exhaust application, are able to function for fairly long periods of time.

As a most preferred embodiment, for an exhaust gas application, I use catalysts comprising activated transitional alumina impregnated with from about 0.01 to 1 percent by weight of platinum treated with from about 3 to 7 percent by weight of phosphoric or phosphorous acid and subjected to reducing treatment in the presence of an organic reducing agent. These catalysts are active at extremely low temperature—the time during which the exhaust gas stream generally contains the greatest concentration of the undesirable carbon monoxide and hydrocarbon constituents. Moreover, using activated transitional alumina as the catalyst carrier, the catalyst has a greater degree of heat stability and can withstand extremely high tempertures. These catalysts are also resistant to the many catalyst poisons found in automobile exhaust gases, particularly lead salts and sulfur. This is an important consideration, for virtually all gasolines contain tetraethyllead as an antiknock agent. Also, many gasolines contain up to about 0.1 weight percent sulfur, and it could entail a significant expenditure to remove such compounds. These catalysts are also resistant to the poisoning effects of many other modern gasoline additives such as phosphorus compounds, antioxidants, dyes, etc.

The preferred platinum catalysts of this invention are extremely hard materials, and thus have great resistance to attrition due to physical shocks. This is very important for, because of the very nature of this application, the catalyst is subjected to continual jarring and agitation at all times while the vehicle is being operated. The resistance to attrition of these catalysts is such that special mechanical contrivances are not required to safeguard the catalyst material. The catalyst is put into a suitable container with openings to receive and discharge the exhaust gases. To firmly retain the catalyst material, the receiving and discharge openings are covered with wire screening. The container may have internal baffling to allow greatest contact between catalyst and exhaust gas, and/or to use the hot reaction gases to heat the incoming exhaust gases. The container may actually replace the vehicle muffler, or it may be incorporated into the conventional exhaust system of current vehicles. The catalyst bed may also be located in the exhaust manifold or in the tailpipe of the exhaust system.

The amount of the finished catalyst required for efficient operation varies dependent on the specific metal and carrier material used, and upon the amount of loading of the active constituent on the carrier. With a more efficient system, as little as about one pound of the catalyst may suffice whereas with some catalyst systems, as much as 35 pounds may be required.

To aid the oxidation, secondary air can be introduced into the system. To obtain maximum efficiency, I have found it preferable to introduce secondary air into the system. This is accomplished by the use of a variable speed blower, so that the amount of secondary air varies with operating conditions. The secondary air supply may also be introduced as a natural flow through the use of an appropirate air scoop or the like.

The method of this invention can be used to convert the exhaust gas of any gasoline. The gasolines can be of the aliphatic, aromatic, or olefinic type including both straight run and catalytically produced gasolines and any and all mixtures thereof. The gasolines can contain the usual additives including organolead and other antiknock agents, such as tetraethyllead, tetraphenyllead, tetramethyllead mixtures of alkylleads, such as tetraethyllead–tetramethyllead mixtures, ferrocene, methylcyclopentadienyl manganese tricarbonyl, cyclopentadienyl nickle nitrosyl, antioxidants such as aromatic amines and diamines, 2,6-dialkyl- and 2,4,6-trialkyl phenols, dyes, deposit modifiers, including trimethylphosphate, dimethylphenylphosphate, and the like.

Another outstanding property of the catalysts of this invention is that they are resistant to the poisoning effects of halogenated scavenging compounds. Thus, my catalysts can be used to treat the exhaust gas resulting from the combustion of leaded fuels containing the normal amounts of the halogenated scavenging compounds.

I claim:

1. A method of substantially oxidizing the unburned hydrocarbon and carbon monoxide constituents of the exhaust gas of internal combustion engines, said method comprising contacting said exhaust gas in the presence of oxygen with an exhaust gas oxidation catalyst prepared by (a) impregnating an alumina carrier with from 0.003 to 5 percent by weight of platinum as a compound of platinum and with from about 1 to 15 percent, based on the weight of said carrier, of a phosphorus compound selected from the group consisting of the acids of phosphorus and ammonium phosphate, and (b) heating the resultant material to a temperature within the range of from about 300–1000° C.

2. The method of claim 1 wherein said exhaust gas oxidation catalyst is prepared by (a) impregnating an alumina carrier with (i) from 0.003 to 5 percent by weight of platinum as a compound of platinum, (ii) from about 1 to 15 percent, based on the weight of said carrier, of a phosphorus compound selected from the group consisting of the acids of phosphorus and ammonium phosphate, and (iii) with a reducing agent, and (b) subsequently heating the resultant material to a temperature within the range of from about 300–1000° C.

3. The method of claim 1 wherein said exhaust gas oxidation catalyst is prepared by (a) impregnating an activated transitional alumina with from about 0.003 to 5 percent, based on the weight of the said alumina, of platinum as a compound of platinum, to form a catalyst composite, (b) heating said composite to a temperature of from about 25–1000° C., (c) treating the composite thereby produced with from about 1 to 15 percent, based on the weight of alumina, of a phosphorus compound selected from the group consisting of the acids of phosphorus and ammonium phosphate, and (d) thereafter heating the phosphorus-treated composite thereby produced in an oxidizing atmosphere at a temperature of from about 300–1000° C.

4. The method of claim 1 wherein said exhaust gas oxidation catalyst is prepared by (a) impregnating an activated transitional alumina with from about 0.01 to 1.0 percent of platinum as a solution of chloroplatinic acid to form a catalyst composite, (b) heating the resultant composite at a temperature of about 25–1000° C., (c) treating said composite with from about 1 to 15 percent, based on the weight of alumina, of a phosphorus compound selected from the group consisting of the acids of phosphorus and ammonium phosphate, (d) heating the treated composite at a temperature of from 25–1000° C., (e) treating the resulting composite with a reducing agent, and (f) heating the resultant composite in an oxidizing atmosphere at a temperature from about 300–1000° C.

5. The method of claim 1 wherein said phosphorus compound is orthophosphorus acid and the amount of said phosphorus compound with which said carrier is treated is from about 3 to about 7 percent, based on the weight of said carrier.

6. The method of claim 1 wherein said phosphorus compound is orthophosphoric acid and the amount of said phosphorus compound with which said carrier is treated is from about 3 to about 7 percent, based on the weight of carrier.

7. A method of substantially oxidizing the unburned hydrocarbon and carbon monoxide constituents of the exhaust gas of internal combustion engines, said method comprising contacting said exhaust gas together with oxygen with an exhaust gas oxidation catalyst, said catalyst consisting essentially of an activated transitional alumina impregnated with:

(A) from about 1 to about 15 weight percent based on the weight of alumina of a phosphorus compound selected from the group consisting of ammonium phosphate and the acids of phosphorus, and
(B) about 0.003 to 5 weight percent based on the weight of alumina of platinum.

8. A method of substantially oxidizing the unburned hydrocarbon and carbon monoxide constituents of the exhaust gas of internal combustion engines, said method comprising contacting said exhaust gas together with oxygen with an exhaust gas oxidation catalyst prepared by impregnating an activated transitional alumina with from about 0.003 to 5 weight percent of platinum as a solution of a platinum compound and from about 0.1 to 5 weight percent of chromium as a solution of a chromium compound to form a catalyst composite, heating the resulting composite at a temperature of from about 25–1000° C., subsequently treating the heat-treated composite thereby produced with from about 1 to 15 weight percent of orthophosphoric acid, and heating the phosphoric acid-treated composite thereby produced in an oxidizing atmosphere at a temperature of from about 300–1000° C.

References Cited by the Examiner
UNITED STATES PATENTS

| | | | |
|---|---|---|---|
| 2,317,683 | 4/1943 | Greensfelder | 252—465 X |
| 2,758,062 | 8/1956 | Arundale et al. | 252—465 X |
| 2,890,167 | 6/1959 | Haensel | 252—437 X |
| 3,025,133 | 3/1962 | Robinson et al. | 252—437 X |

MAURICE A. BRINDISI, *Primary Examiner.*
JULIUS GREENWALD, *Examiner.*